US 9,744,967 B2

United States Patent
Umetsu et al.

(10) Patent No.: US 9,744,967 B2
(45) Date of Patent: Aug. 29, 2017

(54) VEHICLE BEHAVIOR CONTROL DEVICE

(71) Applicant: MAZDA MOTOR CORPORATION, Hiroshima (JP)

(72) Inventors: Daisuke Umetsu, Hiroshima (JP); Osamu Sunahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/342,820

(22) Filed: Nov. 3, 2016

(65) Prior Publication Data

US 2017/0129481 A1 May 11, 2017

(30) Foreign Application Priority Data

Nov. 6, 2015 (JP) .................................. 2015-218639

(51) Int. Cl.
*B60W 30/045* (2012.01)
*B60W 10/04* (2006.01)

(52) U.S. Cl.
CPC .......... *B60W 30/045* (2013.01); *B60W 10/04* (2013.01); *B60W 2510/182* (2013.01); *B60W 2510/202* (2013.01); *B60W 2520/10* (2013.01); *B60W 2520/12* (2013.01); *B60W 2520/14* (2013.01); *B60W 2520/26* (2013.01);
(Continued)

(58) Field of Classification Search
None
See application file for complete search history.

(56) References Cited

U.S. PATENT DOCUMENTS 6,502,028 B2 * 12/2002 Sato .......................... B60T 8/00
180/170
6,556,909 B2 * 4/2003 Matsumoto ............ B62D 7/159
180/204

(Continued)

FOREIGN PATENT DOCUMENTS

EP 2 712 780 A1 4/2014
EP 2 712 782 A1 4/2014
(Continued)

*Primary Examiner* — Russell Frejd
(74) *Attorney, Agent, or Firm* — Studebaker & Brackett PC

(57) ABSTRACT

The vehicle behavior control device comprises a PCM configured to decide a target additional deceleration. The PCM is operable: to correct the target additional deceleration in such a manner that it is reduced by multiplying the target additional deceleration by a coefficient K1 set according to a vehicle speed, a coefficient K2 set according to a steering wheel angle, a coefficient K3 set according to an accelerator position and a coefficient K4 decided according to a required deceleration; when a value derived by multiplying the target additional deceleration by K1 and K2 is less than a threshold $D_T$, to stop a torque reduction control; and, when the value derived by multiplying the target additional deceleration by K1 and K2 is equal to or greater than $D_T$, and a value derived by multiplying the target additional deceleration by K3 and K4 is less than $D_T$, to maintain the torque reduction control.

7 Claims, 9 Drawing Sheets

(52) U.S. Cl.
CPC ... *B60W 2540/10* (2013.01); *B60W 2720/125* (2013.01); *B60W 2720/14* (2013.01)

(56) References Cited

U.S. PATENT DOCUMENTS

| | | | |
|---|---|---|---|
| 7,593,801 B2* | 9/2009 | Lock | B60K 31/04 |
| | | | 180/170 |
| 8,395,491 B2* | 3/2013 | Kummel | B60K 28/16 |
| | | | 180/446 |
| 8,433,493 B2 | 4/2013 | Takahashi et al. | |
| 8,538,653 B2 | 9/2013 | Miyajima et al. | |
| 8,548,706 B2* | 10/2013 | Miura | B60T 8/1755 |
| | | | 303/146 |
| 8,676,464 B2 | 3/2014 | Shimura et al. | |
| 8,880,293 B2 | 11/2014 | Hirao et al. | |
| 8,977,464 B1 | 3/2015 | Takahashi et al. | |
| 8,989,981 B2 | 3/2015 | Yamakado et al. | |
| 9,043,116 B2 | 5/2015 | Takahashi et al. | |
| 9,086,427 B2 | 7/2015 | Maeda et al. | |
| 9,139,107 B2 | 9/2015 | Kageyama et al. | |
| 9,187,121 B2* | 11/2015 | Gerecke | B62D 6/003 |
| 9,211,875 B2 | 12/2015 | Harada | |
| 9,296,374 B2 | 3/2016 | Yamakado et al. | |
| 9,352,747 B2 | 5/2016 | Nagatsuka et al. | |
| 2011/0202250 A1 | 8/2011 | Miyajima et al. | |
| 2012/0053791 A1 | 3/2012 | Harada | |
| 2012/0209489 A1 | 8/2012 | Saito et al. | |
| 2012/0277965 A1 | 11/2012 | Takahashi et al. | |
| 2012/0316744 A1 | 12/2012 | Shimura et al. | |
| 2013/0041541 A1 | 2/2013 | Kageyama et al. | |
| 2013/0079988 A1 | 3/2013 | Hirao et al. | |
| 2013/0345901 A1 | 12/2013 | Maeda et al. | |
| 2014/0222309 A1 | 8/2014 | Yamakado et al. | |
| 2015/0094924 A1 | 4/2015 | Takahashi et al. | |
| 2015/0094927 A1 | 4/2015 | Takahashi et al. | |
| 2015/0120121 A1 | 4/2015 | Nobumoto et al. | |
| 2015/0166025 A1 | 6/2015 | Nagatsuka et al. | |
| 2015/0239442 A1 | 8/2015 | Yamakado et al. | |
| 2015/0298696 A1 | 10/2015 | Nagatsuka et al. | |
| 2015/0321669 A1 | 11/2015 | Inou et al. | |
| 2015/0367852 A1 | 12/2015 | Nagatsuka et al. | |
| 2016/0059852 A1 | 3/2016 | Yamakado et al. | |
| 2016/0244038 A1 | 8/2016 | Yamakado et al. | |

FOREIGN PATENT DOCUMENTS

| | | |
|---|---|---|
| JP | 2011-088576 A | 5/2011 |
| JP | 2014-166014 A | 9/2014 |
| JP | 2015-085820 A | 5/2015 |
| JP | 2015-085823 A | 5/2015 |
| JP | 2015-089251 A | 5/2015 |
| JP | 2015-089252 A | 5/2015 |
| JP | 2015-182752 A | 10/2015 |
| JP | 2016-039750 A | 3/2016 |
| JP | 2016-039751 A | 3/2016 |
| WO | 2012/042935 A1 | 4/2012 |
| WO | 2014/054432 A1 | 4/2014 |
| WO | 2014/119171 A1 | 8/2014 |
| WO | 2016/020718 A1 | 2/2016 |

* cited by examiner

VEHICLE BEHAVIOR CONTROL DEVICE

TECHNICAL FIELD

The present invention relates to a vehicle behavior control device, and more particularly to a vehicle behavior control device for controlling a behavior of a vehicle having steerable front road wheels.

BACKGROUND ART

Heretofore, there has been known a control system capable of, in a situation where a behavior of a vehicle becomes unstable due to road wheel slip or the like, controlling the vehicle behavior to enable a safe traveling (e.g., an antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust a load to be applied to front road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle according to a yaw rate-related quantity corresponding to a steering wheel operation of a driver (e.g., yaw acceleration), thereby making it possible to quickly generate a vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, a load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsiveness to a turning operation of a steering wheel. This makes it possible to realize a vehicle behavior as intended by the driver.

CITATION LIST

[Patent Document]
Patent Document 1: JP 2011-88576A
Patent Document 2: JP 2014-166014A

SUMMARY OF INVENTION

Technical Problem

Here, assume a situation where steering is performed during traveling at a low vehicle speed (e.g., a situation where a steering wheel operation is performed at a high steering speed during traveling in a large parking area at a low vehicle speed). In this situation, if the driving force for the vehicle is reduced to the same level as that in a situation where the steering is performed in the same manner during traveling at a high vehicle speed, a deceleration is generated in the vehicle to apply a load to the front road wheels, despite a state in which the vehicle speed is low and thereby there is no need to improve the turn-in ability, so that the vehicle speed is excessively reduced, or the turn-in ability is unnecessarily improved.

Generally, a driver becomes more sensitive to a change in vehicle speed, as the driver desires a larger driving force for the vehicle and therefore depresses an accelerator pedal more largely. Here, assume a situation where steering is performed when the accelerator pedal is largely depressed (e.g., during merging into an expressway at an entrance thereof, during lane change on an uphill road, or during turning of an S-shaped curve on an uphill road). In this situation, if the driving force for the vehicle is reduced to the same level as that in a situation where the steering is performed in the same manner when the accelerator pedal is not largely depressed (e.g., in a situation where the driver slightly places his/her foot on the accelerator pedal to perform turning of a curve or lane change on a flat road at a constant vehicle speed), the driver has an uncomfortable feeling as if brake dragging occurred.

Similarly, a driver becomes more sensitive to a change in deceleration, as the driver intends to decelerate the vehicle and therefore depresses a brake pedal more largely. Here, assume a situation where steering is performed when the brake pedal is largely depressed (e.g., during traveling on a spiral downslope of a multi-story parking lot). In this situation, if the driving force for the vehicle is reduced to the same level as that in a situation where the steering is performed in the same manner when the brake pedal is not largely depressed (e.g., during turning of a curve or lane change on a flat road at a constant vehicle speed), the driver has an uncomfortable feeling that a deceleration is generated at a level greater than that intended by the driver.

Therefore, the present inventors have proposed a vehicle behavior control device configured to correct a driving force reduction amount decided according to a yaw rate-related amount, in such a manner that the driving force reduction amount is reduced more largely as a vehicle speed of the vehicle becomes smaller, or a required driving force for the vehicle becomes larger, or a required deceleration for the vehicle becomes larger (JP 2015-89251A, JP 2015-85820A and JP 2015-85823A).

In the case that the driving force reduction amount is corrected such that it is reduced based on the vehicle speed, the required driving force, the required deceleration or the like as mentioned above, there is a possibility that the resulting corrected driving force reduction amount become an extremely small value, and almost no difference in vehicle behavior arises between respective states with and without the control of reducing the driving force (driving force reduction control). From a viewpoint of reducing a processing load of the vehicle behavior control device or reducing an operating load of various actuators (e.g., a throttle valve, an ignition unit and a fuel injection valve) to be controlled to reduce the driving force, it is preferable that the driving force reduction control is not performed in the above situation.

However, if the vehicle behavior control device is simply configured such that the driving force reduction control is not performed when the corrected driving force reduction amount is less than a given threshold, a driver is likely to recognize, as an uncomfortable feeling, a change in vehicle behavior between the states with and without the driving force reduction control, depending on a value of the vehicle speed, the required driving force, the required deceleration or the like around a timing when the corrected driving force reduction amount cuts across the given threshold. For example, assume a situation where the vehicle speed is high to some degree and there is a strong need to improve the turn-in ability. In this situation, if the driving force reduction control is stopped when the accelerator pedal or the brake pedal is largely depressed and therefore the corrected driving force reduction amount becomes less than the threshold, the turn-in ability of the vehicle is slightly deteriorated, thereby causing a change in reaction force to a steering wheel, a change in traveling direction of the vehicle, and others. This is likely to give an uncomfortable feeling to a driver.

The present invention has been made in view of solving the above conventional problem, and an object thereof is to provide a vehicle behavior control device capable of performing a vehicle behavior control so as to accurately realize a vehicle behavior as intended by a driver, while reducing a processing load without giving any uncomfortable feeling to the driver.

Solution to Technical Problem

In order to achieve the above object, the present invention provides a vehicle behavior control device for controlling a behavior of a vehicle having steerable front road wheels. The vehicle behavior control device comprises driving force controller configured to decide a target additional deceleration to be added to the vehicle, according to a yaw rate-related quantity which is related to a yaw rate of the vehicle, and reduce a driving force for the vehicle so as to realize the target additional deceleration, wherein the driving force controller is operable: to correct the target additional deceleration in such a manner that it is reduced by multiplying the target additional deceleration by: a vehicle speed coefficient of 1 or less, which is set according to a vehicle speed of the vehicle; a steering wheel angle coefficient of 1 or less, which is set according to a steering wheel angle of the vehicle; an accelerator position coefficient of 1 or less, which is set according to an accelerator position of the vehicle; and a required deceleration coefficient of 1 or less, which is decided according to a required deceleration of the vehicle; when a value derived by multiplying the target additional deceleration by the vehicle speed coefficient and the steering wheel angle coefficient is less than a given determination threshold, to stop control of reducing the driving force; and, when the value derived by multiplying the target additional deceleration by the vehicle speed coefficient and the steering wheel angle coefficient is equal to or greater than the determination threshold, and a value derived by multiplying the target additional deceleration by the accelerator position coefficient and the required deceleration coefficient is less than the determination threshold, to perform the control of reducing the driving forcer for the vehicle so as to realize the corrected target additional deceleration.

In the vehicle behavior control device of the present invention having the above feature, when the value derived by multiplying the target additional deceleration by the vehicle speed coefficient and the steering wheel angle coefficient is less than the determination threshold, the control of reducing the driving force is stopped. Thus, in a situation where it is considered based on the vehicle speed and the steering wheel angle that there is a weak need to improve the turn-in ability, and there is a low possibility of giving an uncomfortable feeling to a driver even if the control of reducing the driving force is stopped, it becomes possible to stop the control of reducing the driving force to reduce a processing load, without giving any uncomfortable feeling to the driver. In addition, when the value derived by multiplying the target additional deceleration by the vehicle speed coefficient and the steering wheel angle coefficient is equal to or greater than the determination threshold, and a value derived by multiplying the target additional deceleration by the accelerator position coefficient and the required deceleration coefficient is less than the determination threshold, the control of reducing the driving forcer for the vehicle is performed so as to realize the corrected additional deceleration. Thus, in a situation where it is considered based on the vehicle speed and the steering wheel angle that there is a strong need to improve the turn-in ability, it becomes possible to maintain the control of reducing the driving force and prevent an uncomfortable feeling from being given to the driver, even when the target additional deceleration is corrected to a value less than the determination threshold, based on the accelerator position and the required deceleration. That is, it becomes possible to perform a vehicle behavior control so as to accurately realize a vehicle behavior as intended by a driver, while reducing a processing load without giving any uncomfortable feeling to the driver.

Preferably, in the vehicle behavior control device of the present invention, the vehicle speed coefficient is set such that it is reduced to a smaller value as the vehicle speed becomes smaller.

According to this feature, a deceleration to be generated in the vehicle can be reduced to a smaller value as the vehicle speed becomes smaller. This makes it possible to prevent the occurrence of an undesirable situation where a deceleration is additionally generated in a state in which the vehicle speed is already low and thereby there is no need to improve the turn-in ability, resulting in excessively reduced vehicle speed or unnecessarily improved turn-in ability.

Preferably, in the vehicle behavior control device of the present invention, the steering wheel angle coefficient is set such that it is reduced to a smaller value as the steering wheel angle becomes smaller.

According to this feature, a deceleration to be added to the vehicle can be reduced to a smaller value as the steering wheel angle becomes smaller. This makes it possible to prevent the occurrence of an undesirable situation where a deceleration is additionally generated in a state in which the steering wheel angle is sufficiently small and thereby there is no need to improve the turn-in ability, resulting in unnecessarily improved turn-in ability.

Preferably, in the vehicle behavior control device of the present invention, the accelerator position coefficient is set such that it is reduced to a smaller value as the accelerator position becomes larger.

According to this feature, a deceleration to be added to the vehicle can be reduced to a smaller value as the accelerator position becomes larger. This makes it possible to prevent an uncomfortable feeling as if brake dragging occurred, from being given to a driver, when the driver largely depresses an accelerator pedal, and is therefore sensitive to a change in vehicle speed.

Preferably, in the vehicle behavior control device of the present invention, the required deceleration coefficient is set such that it is reduced to a smaller value as the required deceleration becomes larger.

According to this feature, a deceleration to be added to the vehicle can be reduced to a smaller value as the required deceleration becomes larger. This makes it possible to prevent an uncomfortable feeling that a deceleration is generated at a level greater than that intended by a driver, when the driver largely depresses a brake pedal, and is therefore sensitive to a change in deceleration.

Preferably, in the vehicle behavior control device of the present invention, the driving force controller is operable, when the steering wheel angle of the vehicle is increasing and the yaw rate-related quantity is increasing, to reduce the driving force according to the yaw rate-related quantity being increasing.

According to this feature, when the steering wheel angle of the vehicle and the yaw rate-related amount are increasing after start of a steering wheel turning operation, it becomes possible to reduce the driving force to apply a sufficient load to the front road wheels and thus increase a cornering force of the front road wheels, and reliably improve responsiveness of the vehicle to the steering wheel turning operation, while reducing a processing load without giving any uncomfortable feeling to a driver.

Effect of Invention

The vehicle behavior control device of the present invention can perform a vehicle behavior control so as to accurately realize a vehicle behavior as intended by a driver, while reducing a processing load without giving any uncomfortable feeling to the driver.

BRIEF DESCRIPTION OF DRAWINGS

FIGS. 11A to 11G are diagrams depicting a temporal change of each parameter pertaining to engine control to be performed by the vehicle behavior control device according to this embodiment during turning of a vehicle equipped with the vehicle behavior control device, wherein: FIG. 11A is a top plan view schematically depicting the vehicle which is turning in a clockwise direction; FIG. 11B is a diagram depicting a change in steering wheel angle of the vehicle which is turning in the clockwise direction as depicted in FIG. 11A; FIG. 11C is a diagram depicting a change in steering speed of the vehicle which is turning in the clockwise direction as depicted in FIG. 11A; FIG. 11D is a diagram depicting a change in additional deceleration decided based on the steering speed depicted in FIG. 11C; FIG. 11E is a diagram depicting a change in torque reduction amount decided based on the additional deceleration depicted in FIG. 11D; FIG. 11F is a diagram depicting a change in final target torque decided based on a basic target torque and the torque reduction amount; and FIG. 11G is a diagram depicting a change in yaw rate (actual yaw rate) generated in the vehicle when the engine control is performed based on the final target torque depicted in FIG. 11F, and a change in actual yaw rate generated in the vehicle when the engine control based on the torque reduction amount decided by a torque reduction amount-deciding part is not performed.

DESCRIPTION OF EMBODIMENTS

With reference to the accompanying drawings, a vehicle behavior control device according to one embodiment of the present invention will now be described.

Figure 1:
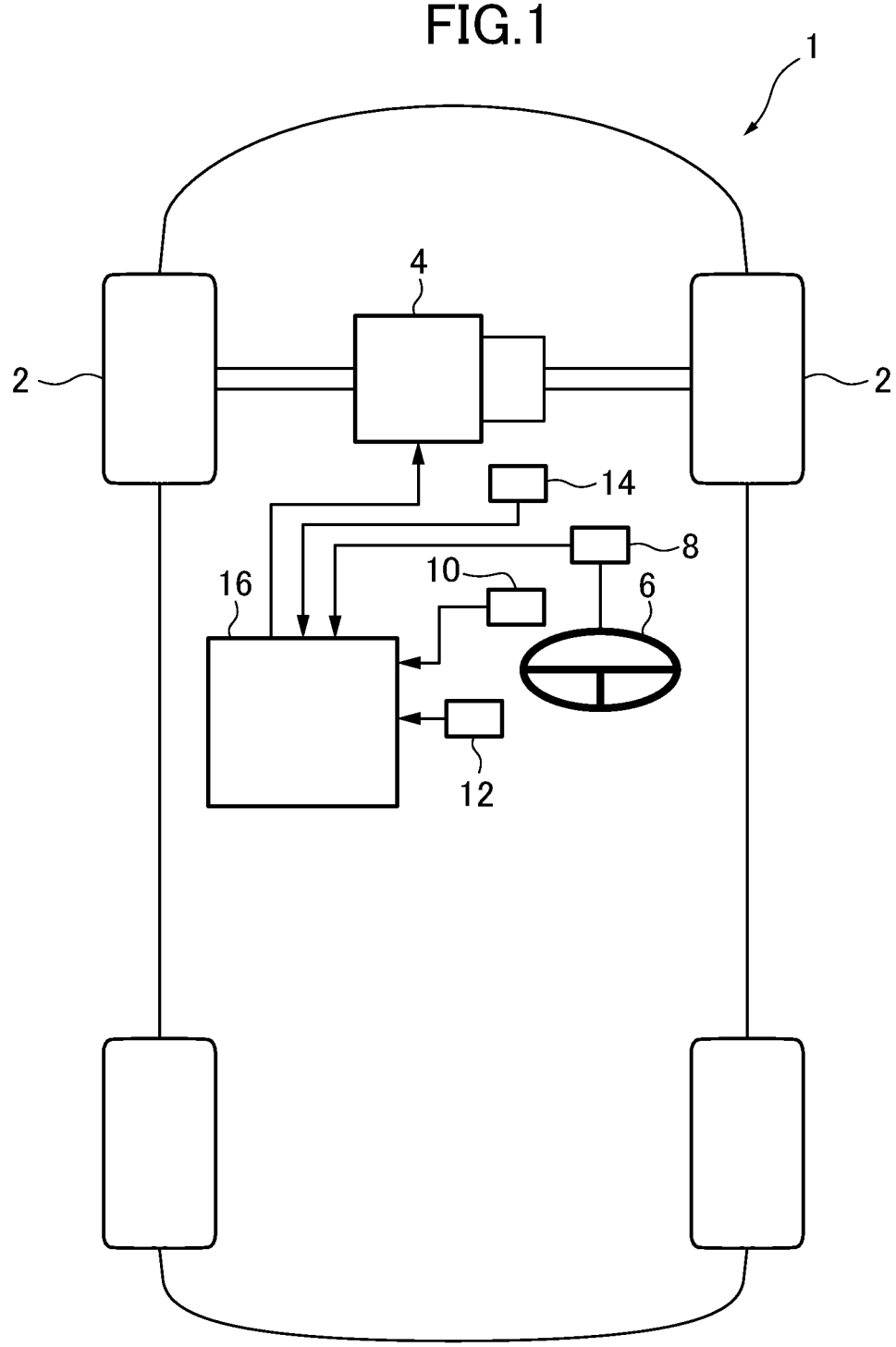
FIG. 1 is a block diagram depicting an entire configuration of a vehicle equipped with a vehicle behavior control device according to one embodiment of the present invention.

First of all, with reference to FIG. 1, a vehicle equipped with the vehicle behavior control device according to this embodiment will be described. FIG. 1 is a block diagram depicting an entire configuration of the vehicle equipped with the vehicle behavior control device according to this embodiment.

In FIG. 1, the reference sign 1 denotes the vehicle equipped with the vehicle behavior control device according to this embodiment. A vehicle body of the vehicle 1 has a front portion on which an engine 4 for driving drive road wheels (in the vehicle depicted in FIG. 1, right and left front road wheels 2) is mounted. The engine 4 is an internal combustion engine such as a gasoline engine or a diesel engine.

The vehicle 1 has: a steering wheel angle sensor 8 for detecting a rotational angle of a steering wheel 6 (steering wheel angle); an accelerator position sensor 10 for detecting an amount of depression of an accelerator pedal (accelerator position); a vehicle speed sensor 12 for detecting a vehicle speed; and a brake fluid pressure sensor 14 for detecting a brake fluid pressure. Each of the above sensors is operable to output a detection value to a PCM (Power-train Control Module) 16.

Figure 2:
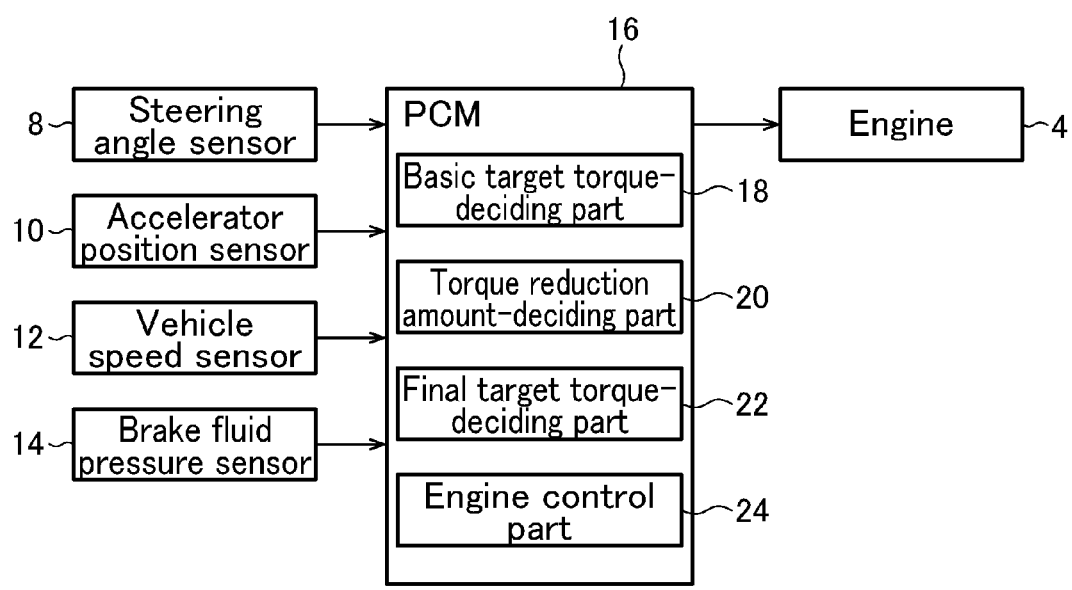
FIG. 2 is a block diagram depicting an electrical configuration of the vehicle behavior control device according to this embodiment.

Next, with reference to FIG. 2, an electrical configuration of the vehicle behavior control device according to this embodiment will be described. FIG. 2 is a block diagram depicting the electrical configuration of the vehicle behavior control device according to this embodiment.

The PCM 16 (vehicle behavior control device, driving force controller, controller) according to this embodiment is configured to, based on detection signals output from the above sensors 8 to 14, and detection signals output from various other sensors for detecting an operating state of the engine 4, generate and output control signals to perform controls with respect to various components (e.g., a throttle valve, a turbocharger, a variable valve mechanism, an ignition unit, a fuel injection valve, and an EGR unit) of the engine 4.

The PCM 16 comprises: a basic target torque-deciding part 18 for deciding a basic target torque based on a driving state of the vehicle 1 including an accelerator pedal operation; a torque reduction amount-deciding part 20 for deciding a torque reduction amount for adding a deceleration to the vehicle 1 based on a yaw rate-related quantity of the vehicle 1; a final target torque-deciding part 22 for deciding a final target torque based on the basic target torque and the torque reduction amount; and an engine control part 26 for controlling the engine 4 to cause the engine 4 to output the final target torque. This embodiment will be described based on an assumption that the torque reduction amount-deciding part 22 is configured to use steering speed of the vehicle 1 as the yaw rate-related quantity.

The above components of the PCM 16 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 3 to 10, processing to be performed by the vehicle behavior control device will be described.

Figure 3:
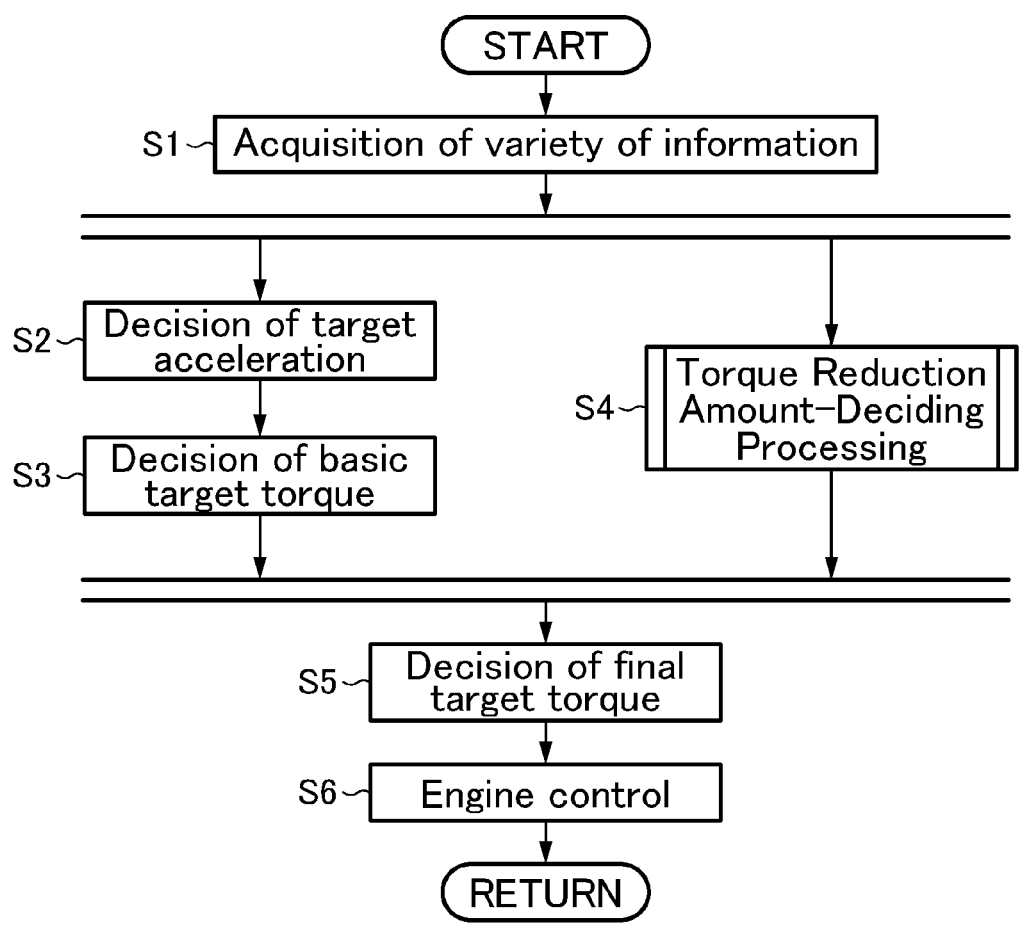
FIG. 3 is a flowchart depicting engine control processing to be performed by the vehicle behavior control device according to this embodiment, so as to control an engine.
Figure 4:
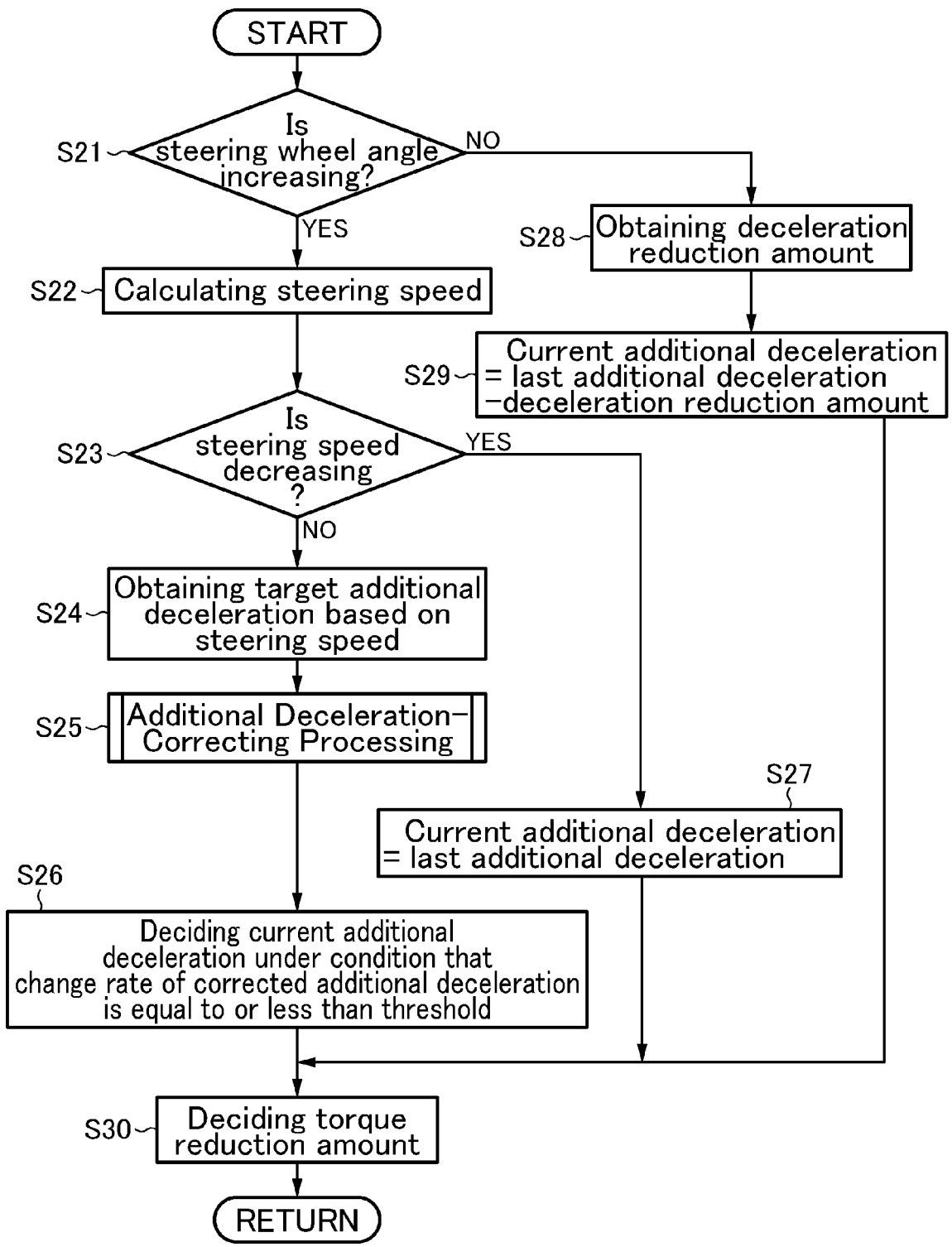
FIG. 4 is a flowchart depicting torque reduction amount-deciding processing to be performed by the vehicle behavior control device according to this embodiment, so as to decide a torque reduction amount.
Figure 5:
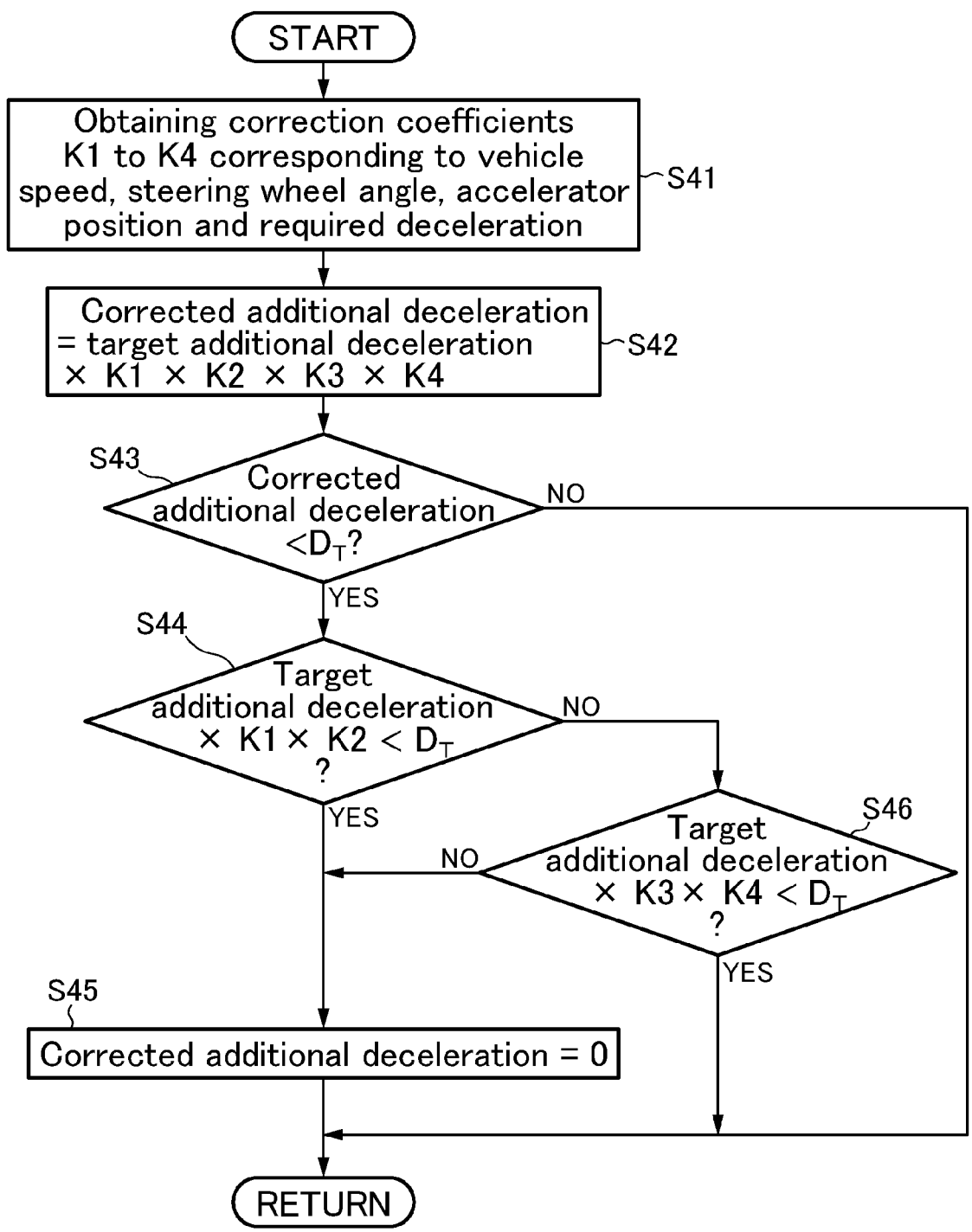
FIG. 5 is a flowchart depicting additional deceleration-correcting processing to be performed by the vehicle behavior control device according to this embodiment, so as to correct an additional deceleration.
Figure 6:
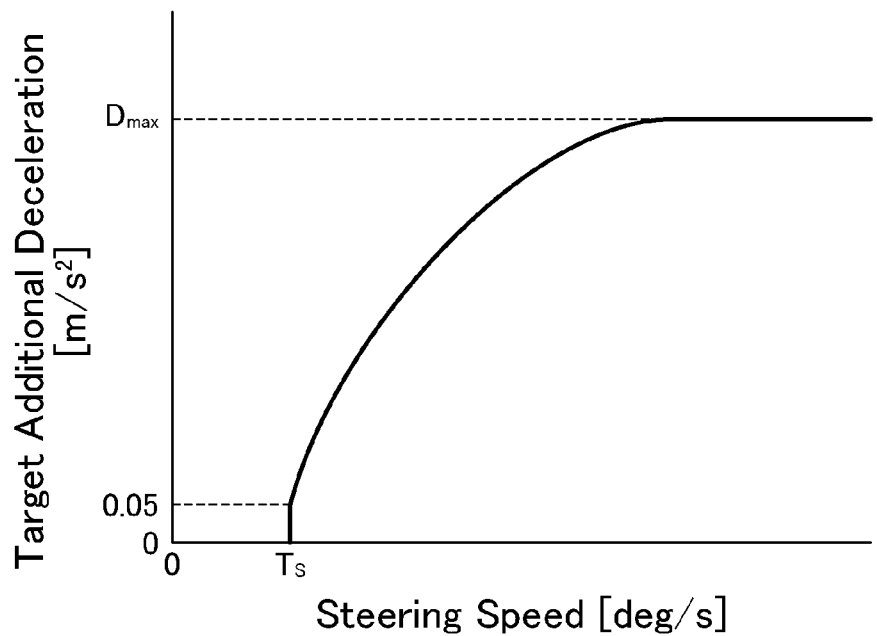
FIG. 6 is a map depicting a relationship between a steering speed, and a target additional deceleration to be decided by the vehicle behavior control device according to this embodiment.

FIG. 3 is a flowchart depicting engine control processing to be performed by the vehicle behavior control device according to this embodiment, so as to control an engine, and FIG. 4 is a flowchart depicting torque reduction amount-deciding processing to be performed by the vehicle behavior control device according to this embodiment, so as to decide a torque reduction amount. FIG. 5 is a flowchart depicting additional deceleration-correcting processing to be performed by the vehicle behavior control device according to this embodiment, so as to correct an additional deceleration, and FIG. 6 is a map depicting a relationship between a steering speed, and a target additional deceleration to be decided by the vehicle behavior control device according to this embodiment. FIGS. 7 to 10 are maps depicting relationships between corresponding ones of four parameters consisting of vehicle speed, steering wheel angle, accelerator position and required deceleration, and four additional deceleration correction coefficients to be decided by the vehicle behavior control device according to this embodiment.

The engine control processing in FIG. 3 is activated when an ignition switch of the vehicle 1 is turned on to apply power to the vehicle behavior control device, and repeatedly executed with a given cycle period.

As depicted in FIG. 3, upon start of the engine control processing, in step S1, the PCM 16 operates to acquire a variety of information about the driving state of the vehicle 1. Specifically, the PCM 16 operates to acquire, as information about the driving state, detection signals output from the aforementioned sensors, including the steering wheel angle detected by the steering wheel angle sensor 8, the accelerator position detected by the accelerator position sensor 10, the vehicle speed detected by the vehicle speed sensor 12, the brake fluid pressure detected by the brake fluid pressure sensor 14, and a gear stage currently set in a transmission of the vehicle 1.

Subsequently, in step S2, the basic target torque-deciding part 18 of the PCM 16 operates to set a target acceleration based on the driving state of the vehicle 1 including the accelerator pedal operation, acquired in the step S1. Specifically, the basic target torque-deciding part 18 operates to select, from a plurality of acceleration characteristic maps defined with respect to various vehicle speeds and various gear stages (the maps are preliminarily created and stored in a memory or the like), one acceleration characteristic map corresponding to a current vehicle speed and a current gear stage, and decide a target acceleration corresponding to a current accelerator position, with reference to the selected acceleration characteristic map.

Subsequently, in step S3, the basic target torque-deciding part 18 operates to decide the basic target torque of the engine 4 for realizing the target acceleration decided in the step S2. In this embodiment, the basic target torque-deciding part 18 operates to decide the basic target torque within a torque range outputtable by the engine 4, based on current vehicle speed, gear stage, road grade, road surface mu ($\mu$), etc.

In parallel to the processing in the steps S2 and S3, in step S4, the torque reduction amount-deciding part 20 operates to perform the torque reduction amount-deciding processing of deciding the torque reduction amount for adding a deceleration to the vehicle 1, based on a steering wheel operation. This torque reduction amount-deciding processing will be described with reference to FIG. 4.

As depicted in FIG. 4, upon start of the torque reduction amount-deciding processing, in step S21, the torque reduction amount-deciding part 20 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 20 operates to calculate the steering speed based on the steering wheel angle acquired in the step S1.

Subsequently, in step S23, the torque reduction amount-deciding part 20 operates to determine whether an absolute value of the calculated steering speed is decreasing.

As a result, when the absolute value of the calculated steering speed is not decreasing, i.e., the absolute value of the calculated steering speed is increasing or the absolute value of the steering speed does not change, the subroutine proceeds to step S24. In the step S24, the torque reduction amount-deciding part 20 operates to obtain the target additional deceleration based on the calculated steering speed. This target additional deceleration is a deceleration to be added to the vehicle 1 according to the steering wheel operation in order to accurately realize a vehicle behavior which is intended by a driver.

Specifically, the torque reduction amount-deciding part 20 operates to obtain a value of the target additional deceleration corresponding to the steering speed calculated in the step S22, based on a relationship between the target additional deceleration and the steering speed, shown by the map in FIG. 6.

In FIG. 6, the horizontal axis denotes the steering speed, and the vertical axis denotes the target additional deceleration. As depicted in FIG. 6, when the steering speed is equal to or less than a threshold $T_S$, a corresponding value of the target additional deceleration is 0. That is, when the steering speed is equal to or less than the threshold $T_S$, the PCM 16 operates to stop control of adding a deceleration to the vehicle 1 (specifically, reduce an output torque of the engine 4) based on the steering wheel operation.

On the other hand, when the steering speed is equal to or less than the threshold $T_S$, as the steering speed is increased to a higher value, a value of the target additional deceleration corresponding to the steering speed is increased from a minimum value (in FIG. 6, 0.05 m/s$^2$) to come closer to a given upper limit value D$_{max}$ (e.g., 1 m/s$^2$). That is, as the steering speed is increased to a higher value, the target additional deceleration is increased to a larger value, and a rate of increase of the target additional deceleration becomes smaller.

Subsequently, in step S25, the torque reduction amount-deciding part 20 operates to execute additional deceleration-correcting processing of correcting the target additional deceleration obtained in the step S24. This additional deceleration-correcting processing will be described with reference to FIG. 5.

As depicted in FIG. 5, upon start of the additional deceleration-correcting processing, in step S41, the torque reduction amount-deciding part 20 operates to obtain correction coefficients K1 to K4 for correcting the additional deceleration, based on the vehicle speed, the steering wheel angle and the accelerator position acquired in the step S1, and a required deceleration specified based on the brake fluid pressure acquired in the step S1.

Specifically, the torque reduction amount-deciding part 20 operates to refer to the maps in FIGS. 7 to 10 depicting relationships between corresponding ones of the four parameters consisting of vehicle speed, steering wheel angle, accelerator position and required deceleration, and the four correction coefficients K1 to K4 to obtain respective values of the correction coefficients K1, K2, K3 and K4 corresponding to acquired values of the vehicle speed, the steering wheel angle and the accelerator position and a specified value of the required deceleration.

Figure 7:
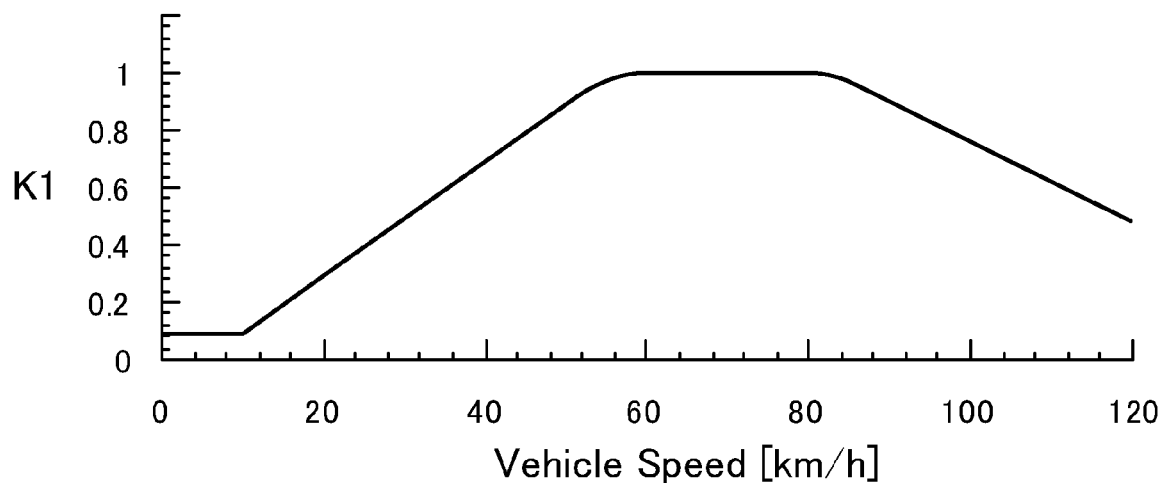
FIG. 7 is a map depicting a relationship between a vehicle speed, and an additional deceleration correction coefficient to be decided by the vehicle behavior control device according to this embodiment.

FIG. 7 is a map depicting a relationship between the vehicle speed, and the additional deceleration correction coefficient K1 to be decided by the torque reduction amount-deciding part 20 in this embodiment. In FIG. 7, the horizontal axis represents the vehicle speed, and the vertical axis represents the correction coefficient K1. As depicted in FIG. 7, in a vehicle speed range of 10 km/h to 60 km/h, the correction coefficient K1 is set such that it becomes smaller as the vehicle speed becomes smaller. On the other hand, in a vehicle speed range of 80 km/h or more, the correction coefficient K1 is set such that it becomes smaller as the vehicle speed becomes higher. In a vehicle speed range of 60 km/h to 80 km/h, the correction coefficient K1 is set to a constant value of 1, i.e., correction of the additional deceleration is not performed. Further, in a vehicle speed range of 10 km/h or less, the correction coefficient K1 is set to a constant value of 0.1.

Figure 8:
FIG. 8 is a map depicting a relationship between a steering wheel angle, and an additional deceleration correction coefficient to be decided by the vehicle behavior control device according to this embodiment.

FIG. 8 is a map depicting a relationship between the steering wheel angle, and the additional deceleration correction coefficient K2 to be decided by the torque reduction amount-deciding part 20 in this embodiment. In FIG. 8, the horizontal axis represents the steering wheel angle, and the vertical axis represents the correction coefficient K2. As depicted in FIG. 8, when the steering wheel angle is less than 120 deg, the correction coefficient K2 is set such that it becomes smaller as the steering wheel angle becomes smaller. On the other hand, when the steering wheel angle is equal to or greater than 120 deg, the correction coefficient K2 is set to a constant maximum value of 1. Further, when the steering wheel angle is 0 deg, the correction coefficient K2 has a minimum value of 0.3.

Figure 9:
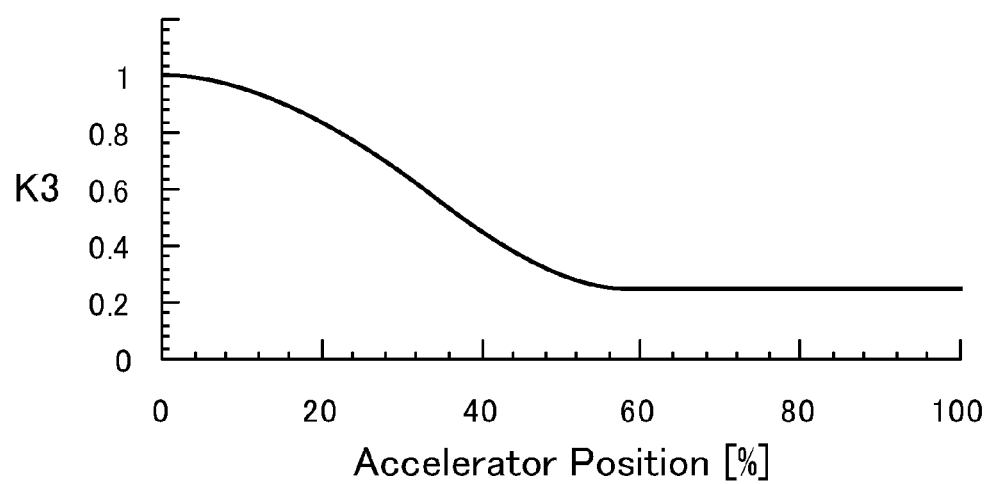
FIG. 9 is a map depicting a relationship between an accelerator position, and an additional deceleration correction coefficient to be decided by the vehicle behavior control device according to this embodiment.

FIG. 9 is a map depicting a relationship between the accelerator position, and the additional deceleration correction coefficient K3 to be decided by the torque reduction amount-deciding part 20 in this embodiment. In FIG. 9, the horizontal axis represents the accelerator position, and the vertical axis represents the correction coefficient K3. As depicted in FIG. 9, when the accelerator position is less than 60%, the correction coefficient K3 is set such that it becomes smaller as the accelerator position becomes larger. On the other hand, when the accelerator position is equal to or greater than 60%, the correction coefficient K3 is set to a constant minimum value of 0.25. Further, when the accelerator position is 0%, the correction coefficient K3 has a maximum value of 1.

Figure 10:
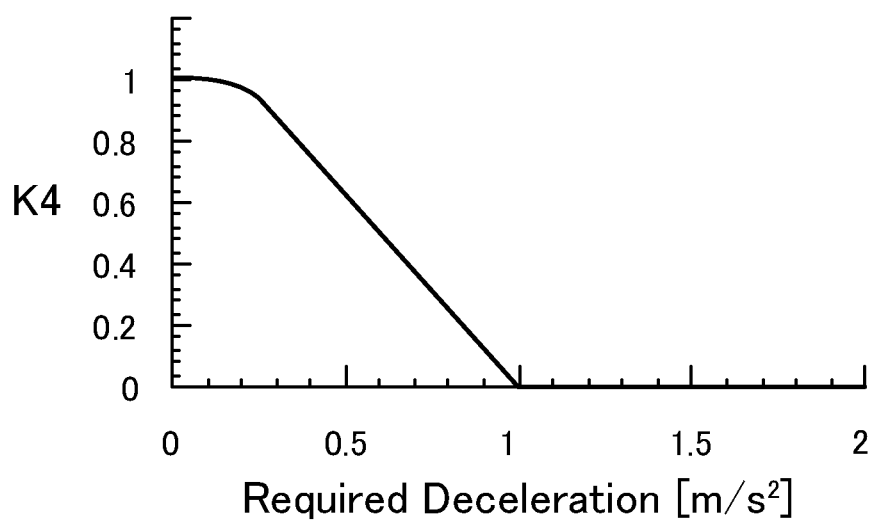
FIG. 10 is a map depicting a relationship between a required deceleration, and an additional deceleration correction coefficient to be decided by the vehicle behavior control device according to this embodiment.

FIG. 10 is a map depicting a relationship between the required deceleration, and the additional deceleration correction coefficient K4 to be decided by the torque reduction amount-deciding part 20 in this embodiment. In FIG. 10, the horizontal axis represents the required deceleration, and the vertical axis represents the correction coefficient K4. As depicted in FIG. 10, when the required deceleration is less than 1 m/s$^2$, the correction coefficient K4 is set such that it becomes smaller as the required deceleration becomes larger. On the other hand, when the required deceleration is equal to or greater than 1 m/s$^2$, the correction coefficient K4 is set to a constant minimum value of 0. Further, when the required deceleration is 0 m/s$^2$, the correction coefficient K4 has a maximum value of 1.

Returning to FIG. 5, in step S41, after obtaining respective values of the correction coefficients K1 to K4 corresponding to the values of the vehicle speed, the steering wheel angle, the accelerator position and the required deceleration, the sub-subroutine proceeds to step S42. In the step S42, the torque reduction amount-deciding part 20 operates to correct the target additional deceleration obtained in the step S24 in FIG. 4 by multiplying the target additional deceleration by all of the correction coefficients K1, K2, k3 and K4 (the corrected target additional deceleration will hereinafter be referred to as "corrected additional deceleration", where appropriate).

Subsequently, in step S43, the torque reduction amount-deciding part 20 operates to determine whether or not the corrected additional deceleration is less than a given threshold D$_T$ (e.g., 0.05 m/s$^2$).

As a result, when the corrected additional deceleration is less than the threshold D$_T$, the sub-subroutine proceeds to step S44. In the step S44, the torque reduction amount-deciding part 20 operates to determine whether or not a value derived by multiplying the target additional deceleration obtained in the step S24 in FIG. 4 by the correction coefficients K1 and K2 is less than the threshold D$_T$.

As a result, when the value derived by multiplying the target additional deceleration by the correction coefficients K1 and K2 is less than the threshold D$_T$, this result is deemed to mean a situation where there is a weak need to improve the turn-in ability because the vehicle speed is sufficiently low or the steering wheel angle is sufficiently small, and therefore there is a low possibility of giving an uncomfortable feeling to a driver even if control of reducing a torque (torque reduction control) is stopped. Thus, the sub-subroutine proceeds to step S45. In the step S45, the torque reduction amount-deciding part 20 operates to set the corrected additional deceleration to 0. That is, the torque reduction control is stopped. Then, the torque reduction amount-deciding part 20 operates to terminate the additional deceleration-correcting processing.

On the other hand, when the value derived by multiplying the target additional deceleration by the correction coefficients K1 and K2 is not less than the threshold D$_T$ (is equal to or greater than the threshold D$_T$), the sub-subroutine proceeds to step S46. In the step S46, the torque reduction amount-deciding part 20 operates to determine whether or not a value derived by multiplying the target additional deceleration obtained in the step S24 in FIG. 4 by the correction coefficients K3 and K4 is less than the threshold $D_T$.

As a result, when the value derived by multiplying the target additional deceleration by the correction coefficients K3 and K4 is less than the threshold $D_T$, this result is deemed to mean that the corrected additional deceleration is less than the threshold $D_T$ due to a large accelerator position or a large required deceleration, despite a situation where there is a strong need to improve the turn-in ability because the vehicle speed is high and the steering wheel angle is large. In this case, if the torque reduction control is stopped, the turn-in ability of the vehicle is slightly deteriorated to cause a change in reaction force to the steering wheel, a change in traveling direction of the vehicle, and others. This is likely to give an uncomfortable feeling to a driver. Therefore, the torque reduction amount-deciding part 20 operates to terminate the additional deceleration-correcting processing without setting the corrected additional deceleration calculated in the step S42 to 0. That is, the torque reduction control is maintained.

On the other hand, when the value derived by multiplying the target additional deceleration by the correction coefficients K3 and K4 is not less than the threshold $D_T$ (is equal to or greater than the threshold $D_T$), this result is not deemed to mean a situation where there is a strong need to improve the turn-in ability because the vehicle speed is high and the steering wheel angle is large. Thus, the sub-subroutine proceeds to step S45. In the step S45, the torque reduction amount-deciding part 20 operates to set the corrected additional deceleration to 0. That is, the torque reduction control is stopped.

Referring to the step S43 again, when the corrected additional deceleration is not less than the threshold $D_T$ (is equal to or greater than the threshold $D_T$), this result is not deemed to mean a situation where the torque reduction control should be stopped. Therefore, the torque reduction amount-deciding part 20 operates to terminate the additional deceleration-correcting processing without setting the corrected additional deceleration calculated in the step S42 to 0. That is, the torque reduction control is maintained.

Returning to FIG. 4, after completion of the additional deceleration-correcting processing in the step S25, the torque reduction amount-deciding part 20 operates to decide an additional deceleration in the current processing cycle, under a condition that an increase rate of the corrected additional deceleration is equal to or less than a threshold $R_{max}$ (e.g., 0.5 m/s³).

Specifically, the torque reduction amount-deciding part 20 operates to, when an increase rate from a value of the additional deceleration decided in the last processing cycle to a value of the corrected additional deceleration obtained in the step S25 in the current processing cycle is equal to or less than the threshold $R_{max}$, decide the value of the corrected additional deceleration obtained in the step S25, as a value of the additional deceleration in the current processing cycle.

On the other hand, the torque reduction amount-deciding part 20 operates to, when the increase rate from the value of the additional deceleration decided in the last processing cycle to the value of the corrected additional deceleration obtained in the step S25 in the current processing cycle is greater than the threshold $R_{max}$, decide, as the value of the additional deceleration in the current processing cycle, a value obtained by increasing the value of the additional deceleration decided in the last processing cycle, at the increase rate $R_{max}$.

Referring to the step S23 again, when the absolute value of the steering speed is decreasing, the subroutine proceeds to step S27. In the step S27, the torque reduction amount-deciding part 20 operates to decide the value of the additional deceleration decided in the last processing cycle, as the value of the additional deceleration in the current processing cycle. That is, when the absolute value of the steering speed is decreasing, a value of the additional deceleration corresponding to a maximum value of the steering speed (i.e., a maximum value of the additional deceleration) is maintained.

Referring to the step S21 again, when the absolute value of the steering wheel angle is not increasing (i.e., is maintained constant or is decreasing), the subroutine proceeds to step S28. In the step S28, the torque reduction amount-deciding part 20 operates to obtain an amount (deceleration reduction amount) by which the value of the additional deceleration decided in the last processing cycle is to be reduced in the current processing cycle. For example, the deceleration reduction amount may be calculated based on a constant reduction rate (e.g., 0.3 m/s³) preliminarily stored in a memory or the like. Alternatively, the deceleration reduction amount may be calculated based on a reduction rate decided according to the driving state of the vehicle 1 acquired in the step S1 and/or the steering speed calculated in Step S22.

Subsequently, in step S29, the torque reduction amount-deciding part 20 operates to decide a value of the additional deceleration in the current processing cycle by subtracting the deceleration reduction amount obtained in the step S28 from the value of the additional deceleration decided in the last processing cycle.

After completion of the step S26, S27 or S29, in step S30, the torque reduction amount-deciding part 20 operates to decide the torque reduction amount, based on the current additional deceleration decided in the step S26, S27 or S29. Specifically, the torque reduction amount-deciding part 20 operates to decide a value of the torque reduction amount required for realizing the current additional deceleration, based on the current vehicle speed, gear stage, road gradient and others acquired in the Step S1. After completion of the step S30, the torque reduction amount-deciding part 20 operates to terminate the torque reduction amount-deciding processing, and the engine control processing routine returns to the main routine.

Returning to FIG. 3, after performing the processing in the steps S2 and S3 and the torque reduction amount-deciding processing in the step S4, in step S5, the final target torque-deciding part 22 operates to subtract a value of the torque reduction amount decided by the torque reduction amount-deciding processing in the step S4, from a value of a basic target torque after being subjected to smoothing in the step S3, to thereby decide the final target torque.

Subsequently, in step S6, the engine control part 24 operates to control the engine 4 to cause the engine 4 to output the final target torque set in the step S5. Specifically, the engine control part 24 operates to, based on the final target torque set in the step S5 and an engine speed, decide various engine state amounts (e.g., air charge amount, fuel injection amount, intake-air temperature, and oxygen concentration) required for realizing the final target torque set in the step S5, and then, based on the decided state amounts, control a plurality of actuators for driving various components of the engine 4. In this case, the engine control part 24 operates to perform engine control in such a manner as to set a limit value or range with respect to each of the state amounts, and set a controlled variable of each actuator to allow its related state amount to preserve limitation by the limit value or range.

After completion of the step S6, the PCM 16 operates to terminate the engine control processing.

Next, with reference to FIGS. 11A to 11G, an operation of the vehicle behavior control device according to this embodiment will be described. FIGS. 11A to 11G are diagrams depicting a temporal change of each parameter pertaining to the engine control to be performed by the vehicle behavior control device according to this embodiment during turning of the vehicle 1 equipped with the vehicle behavior control device.

Figure 11A:
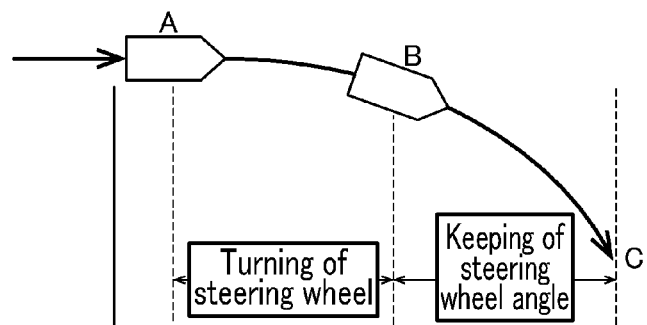

FIG. 11A is a top plan view schematically depicting the vehicle 1 which is turning in a clockwise direction. As depicted in FIG. 11A, the vehicle 1 starts to turn from a position A, and continues to turn from a position B to a position C in the clockwise direction at a constant steering wheel angle.

Figure 11B:
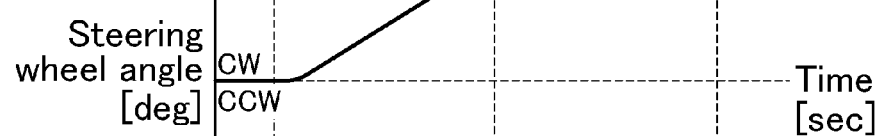

FIG. 11B is a diagram depicting a change in steering wheel angle of the vehicle 1 which is turning in the clockwise direction as depicted in FIG. 11A. In FIG. 11B, the horizontal axis represents the time, and the vertical axis represents the steering wheel angle.

As depicted in FIG. 11B, clockwise steering is started at the position A, and then, along with an additional turning operation of the steering wheel, a clockwise steering wheel angle gradually increases and reaches a maximum value at the position B. Subsequently, the steering wheel angle is maintained constant until the vehicle 1 reaches the position C (Keeping of the steering wheel angle).

Figure 11C:

FIG. 11C is a diagram depicting a change in steering speed of the vehicle 1 which is turning in the clockwise direction as depicted in FIG. 11A. In FIG. 11C, the horizontal axis represents the time, and the vertical axis represents the steering speed.

The steering speed of the vehicle 1 is expressed as a temporal differentiation of the steering wheel angle of the vehicle 1. That is, as depicted in FIG. 11C, when clockwise steering is started at the position A, a clockwise steering speed arises and is maintained approximately constant in an intermediate zone between the position A and the position B. Then, when the clockwise steering speed decreases and the clockwise steering wheel angle reaches the maximum value at the position B, the steering speed becomes 0. Then, when the steering wheel angle is maintained during traveling from the position B to the position C, the steering speed is kept at 0.

Figure 11D:
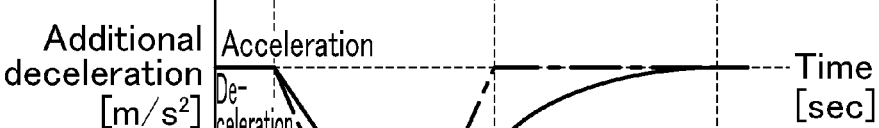

FIG. 11D is a diagram depicting a change in the additional deceleration decided based on the steering speed depicted in FIG. 11C. In FIG. 7D, the horizontal axis represents the time, and the vertical axis represents the additional deceleration. In FIG. 11D, the solid line indicates a change in the additional deceleration decided in the torque reduction amount-deciding processing in FIG. 4, and the one-dot chain line indicates a change in the target additional deceleration based on the steering speed. As with the change in the steering speed depicted in FIG. 11C, the target additional deceleration indicated by the one-dot chain line starts increasing from the position A, and is maintained approximately constant in an intermediate zone between the position A and the position B, whereafter it decreases, and becomes 0 at the position B.

As described with reference to FIG. 4, when the steering wheel angle is determined in the step S21 to be increasing, and the absolute value of the steering speed is determined in the step S23 to be not decreasing, i.e., to be increasing or to have no change, the torque reduction amount-deciding part 20 operates in the step S24 to obtain the target additional deceleration based on the steering speed. Subsequently, in the step S25, the torque reduction amount-deciding part 20 operates to decide the additional deceleration in each processing cycle, under the condition that the increase rate of the additional deceleration is equal to or less than the threshold $R_{max}$.

FIG. 11D depicts a case where an increase rate of the target additional deceleration starting increasing from the position A is greater than the threshold $R_{max}$. In this case, the torque reduction amount-deciding part 20 operates to increase the last additional deceleration at an increase rate equal to the threshold $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 20 operates to decide that the additional deceleration is equal to the target additional deceleration.

Then, when the absolute value of the steering speed is determined, in the step S23 depicted in FIG. 4, to be decreasing, the torque reduction amount-deciding part 20 operates to maintain the additional deceleration at the maximum steering speed, as mentioned above. Specifically, in FIG. 11D, when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering speed is determined, in the step S21 depicted in FIG. 4, to be maintained constant or to be decreasing, the torque reduction amount-deciding part 20 operates to obtain the deceleration reduction amount in the step S28, and reduce the additional deceleration by the deceleration reduction amount, in the step S29, as mentioned above. As depicted in FIG. 11D, the torque reduction amount-deciding part 20 operates to reduce the last additional deceleration to cause a reduction rate of the additional deceleration to become gradually smaller, i.e., to cause a slope of the solid line indicative of a change in the additional deceleration to become gradually gentler.

Figure 11E:

FIG. 11E is a diagram depicting a change in the torque reduction amount decided based on the additional deceleration depicted in FIG. 11D. In FIG. 11E, the horizontal axis represents the time, and the vertical axis represents the torque reduction amount.

As mentioned above, the torque reduction amount-deciding part 20 operates to decide a value of the torque reduction amount required for realizing an additional deceleration, based on the current vehicle speed, gear stage, road gradient and others. Thus, in the case where respective values of these parameters are constant, the torque reduction amount is decided such that it changes in the same pattern as that of the additional deceleration depicted in FIG. 11D.

Figure 11F:
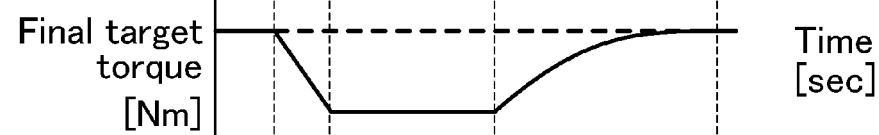

FIG. 11F is a diagram depicting a change in the final target torque decided based on the basic target torque and the torque reduction amount. In FIG. 11F, the horizontal axis represents the time, and the vertical axis represents the torque. In FIG. 11F, the dotted line indicates the basic target torque, and the solid line indicates the final target torque.

As described with reference to FIG. 3, the final target torque-deciding part 22 operates to subtract the value of the torque reduction amount decided by the torque reduction amount-deciding processing in the step S4, from the value of the basic target torque decided in the step S3, to thereby decide the final target torque.

Figure 11G:
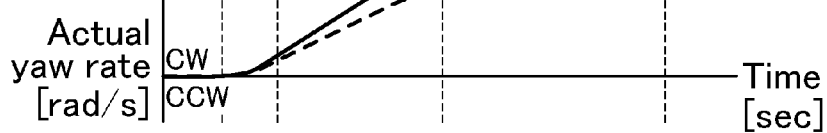

FIG. 11G is a diagram depicting a change in yaw rate (actual yaw rate) generated in the vehicle 1 when control of the engine 4 is performed based on the final target torque depicted in FIG. 11F, and a change in actual yaw rate generated in the vehicle 1 when the control of the engine 4 based on the torque reduction amount decided by the torque reduction amount-deciding part is not performed (i.e., the control of the engine 4 is performed so as to realize the basic target torque indicated by the dotted line in FIG. 11F). In FIG. 11G, the dotted line indicates the basic target torque, and the solid line indicates the yaw rate. Further, in FIG. 11G, the solid line indicates a change in the yaw rate (actual yaw rate) generated when the control of the engine 4 is performed so as to realize the final target torque, and the dotted line indicates a change in the actual yaw rate generated when the control compatible with the torque reduction amount is not performed.

When clockwise steering is started at the position A, and the torque reduction amount is increased along with an increase in the clockwise steering speed, as depicted in FIG. 11E, to reduce the final target torque as depicted in FIG. 11F, a load applied to the front road wheels 2 as steerable road wheels of the vehicle 1 is increased. As a result, a frictional force between each of the front road wheels 2 and a road surface is increased, thereby providing an improved turn-in ability of the vehicle 1. That is, as depicted in FIG. 11G, when the control of the engine 4 is performed in the intermediate zone between the position A and the position B so as to realize the final target torque reflecting the torque reduction amount (solid line), a larger clockwise (CW) yaw rate is generated in the vehicle 1, as compared to the case where the control compatible with the torque reduction amount is not performed (dotted line).

Then, as depicted in FIGS. 11D and 11E, although the target additional deceleration decreases along with a decrease in the steering speed toward the position B, the load applied to the front road wheels is maintained as long as the tuning of the steering wheel is continued, because the torque reduction amount is maintained at its maximum value. Thus, it becomes possible to maintain the turn-in ability of the vehicle 1

Then, when the absolute value of the steering wheel angle is maintained constant during traveling from the position B to the position C, the torque reduction amount is smoothly reduced to smoothly increase the final target torque. Thus, in response to completion of the turning of the steering wheel, the load applied to the front road wheels 2 can be gradually reduced to gradually reduce the cornering force of the front road wheels 2, thereby restoring the output torque of the engine 4, while stabilizing a vehicle body.

Next, some modifications of the above embodiment will be described.

Although the above embodiment has been described based on an example in which the torque reduction amount-deciding part 20 is configured to obtain a target additional deceleration based on the steering speed as the yaw rate-related quantity, and decide a torque reduction amount based on the obtained target additional deceleration, the torque reduction amount-deciding part 20 may be configured to decide a torque reduction amount based on any driving state of the vehicle 1 other than the accelerator pedal operation (e.g., steering wheel angle, yaw rate, or slip ratio).

For example, the torque reduction amount-deciding part 20 may be configured to calculate, as the yaw rate-related quantity, a target yaw acceleration to be generated in the vehicle 1, based on a target yaw rate calculated from the steering wheel angle and the vehicle speed, and a yaw rate input from a yaw rate sensor, and obtain the target additional deceleration based on the calculated target yaw acceleration to decide the torque reduction amount. Alternatively, it is also possible to detect, by the acceleration sensor, a lateral acceleration to be generated in the vehicle 1 along with turning of the vehicle 1, as the yaw rate-related quantity, and decide the torque reduction amount based on the detected lateral acceleration.

The above embodiment has been described based on an example in which the vehicle 1 equipped with the vehicle behavior control device has the engine 4 for driving drive road wheels. However, the vehicle behavior control device of the present invention may also be applied to a vehicle having a motor for driving the drive road wheels by electric power supplied from a battery or a capacitor. In this case, the PCM 16 may be configured to perform control to reduce a torque of the motor according to the steering speed of the vehicle 1.

Next, advantageous effects of the vehicle behavior control device according to the above embodiment and the modifications thereof will be described.

The PCM 16 is operable: to correct the target additional deceleration in such a manner that it is reduced by multiplying the target additional deceleration by the correction coefficient K1 set according to the vehicle speed of the vehicle 1, the correction coefficient K2 set according to the steering wheel angle of the vehicle 1, the correction coefficient K3 set according to the accelerator position of the vehicle 1 and the correction coefficient K4 decided according to the required deceleration of the vehicle 1; and, when the value derived by multiplying the target additional deceleration by the correction coefficients K1 and K2 is less than the threshold $D_T$, to stop the torque reduction control. Thus, in a situation where it is considered based on the vehicle speed and the steering wheel angle that there is a weak need to improve the turn-in ability, and there is a low possibility of giving an uncomfortable feeling to a driver even if the torque reduction control is stopped, it becomes possible to stop the torque reduction control to reduce a processing load, without giving any uncomfortable feeling to the driver. In addition, when the value derived by multiplying the target additional deceleration by the correction coefficients K1 and K2 is equal to or greater than the threshold $D_T$, and the value derived by multiplying the target additional deceleration by the correction coefficients K3 and K4 is less than the threshold $D_T$, the torque reduction control is performed so as to realize the corrected additional deceleration. Thus, in a situation where it is considered based on the vehicle speed and the steering wheel angle that there is a strong need to improve the turn-in ability, it becomes possible to maintain the torque reduction control and prevent an uncomfortable feeling from being given to the driver, even when the target additional deceleration is corrected to a value less than the threshold $D_T$, based on the accelerator position and the required deceleration. That is, it becomes possible to perform a vehicle behavior control so as to accurately realize a vehicle behavior as intended by a driver, while reducing a processing load without giving any uncomfortable feeling to the driver.

In particular, the correction coefficient K1 set according to the vehicle speed is set such that it is reduced to a smaller value as the vehicle speed becomes smaller. Thus, a deceleration to be generated in the vehicle 1 can be reduced to a smaller value as the vehicle speed becomes smaller. This makes it possible to prevent the occurrence of an undesirable situation where a deceleration is additionally generated in a state in which the vehicle speed is already low and thereby there is no need to improve the turn-in ability, resulting in excessively reduced vehicle speed or unnecessarily improved turn-in ability.

The correction coefficient K2 set according to the steering wheel angle is set such that it is reduced to a smaller value as the steering wheel angle becomes smaller. Thus, a deceleration to be added to the vehicle 1 can be reduced to a smaller value as the steering wheel angle becomes smaller. This makes it possible to prevent the occurrence of an undesirable situation where a deceleration is additionally generated in a state in which the steering wheel angle is sufficiently small and thereby there is no need to improve the turn-in ability, resulting in unnecessarily improved turn-in ability.

The correction coefficient K3 set according to the accelerator position is set such that it is reduced to a smaller value as the accelerator position becomes larger. Thus, a deceleration to be added to the vehicle 1 can be reduced to a smaller value as the accelerator position becomes larger. This makes it possible to prevent an uncomfortable feeling as if brake dragging occurred, from being given to a driver, when the driver largely depresses an accelerator pedal, and is therefore sensitive to a change in vehicle speed.

The correction coefficient K4 decided according to the required deceleration is set such that it is reduced to a smaller value as the required deceleration becomes larger. Thus, a deceleration to be added to the vehicle 1 can be reduced to a smaller value as the required deceleration becomes larger. This makes it possible to prevent an uncomfortable feeling that a deceleration is generated at a level greater than that intended by a driver, when the driver largely depresses a brake pedal, and is therefore sensitive to a change in deceleration.

Further, the PCM 16 is operable, when the steering wheel angle of the vehicle 1 is increasing and the steering speed is increasing, to reduce the final target torque according to the steering speed being increasing. Thus, when the steering wheel angle of the vehicle 1 and the steering speed are increasing after start of a steering wheel turning operation, it becomes possible to reduce the final target driving force to apply a sufficient load to the front road wheels as steerable road wheels and thus increase a cornering force of the front road wheels, and reliably improve responsiveness of the vehicle 1 to the steering wheel turning operation, while reducing a processing load without giving any uncomfortable feeling to a driver.

What is claimed is:

1. A vehicle behavior control device for controlling a behavior of a vehicle having steerable front road wheels, comprising a driving force controller configured to decide a target additional deceleration to be added to the vehicle, according to a yaw rate-related quantity which is related to a yaw rate of the vehicle, and reduce a driving force for the vehicle so as to realize the target additional deceleration, wherein the driving force controller is operable:
to correct the target additional deceleration in such a manner that it is reduced by multiplying the target additional deceleration by: a vehicle speed coefficient of 1 or less, which is set according to a vehicle speed of the vehicle; a steering wheel angle coefficient of 1 or less, which is set according to a steering wheel angle of the vehicle; an accelerator position coefficient of 1 or less, which is set according to an accelerator position of the vehicle; and a required deceleration coefficient of 1 or less, which is decided according to a required deceleration of the vehicle;
when a value derived by multiplying the target additional deceleration by the vehicle speed coefficient and the steering wheel angle coefficient is less than a given determination threshold, to stop control of reducing the driving force; and,
when the value derived by multiplying the target additional deceleration by the vehicle speed coefficient and the steering wheel angle coefficient is equal to or greater than the determination threshold, and a value derived by multiplying the target additional deceleration by the accelerator position coefficient and the required deceleration coefficient is less than the determination threshold, to perform the control of reducing the driving force for the vehicle so as to realize the corrected target additional deceleration.

2. The vehicle behavior control device as recited in claim 1, wherein the vehicle speed coefficient is set such that it is reduced to a smaller value as the vehicle speed becomes smaller.

3. The vehicle behavior control device as recited in claim 1, wherein the steering wheel angle coefficient is set such that it is reduced to a smaller value as the steering wheel angle becomes smaller.

4. The vehicle behavior control device as recited in claim 1, wherein the accelerator position coefficient is set such that it is reduced to a smaller value as the accelerator position becomes larger.

5. The vehicle behavior control device as recited in claim 1, wherein the required deceleration coefficient is set such that it is reduced to a smaller value as the required deceleration becomes larger.

6. The vehicle behavior control device as recited in claim 1, wherein the driving force controller is operable, when the steering wheel angle of the vehicle is increasing and the yaw rate-related quantity is increasing, to reduce the driving force according to the yaw rate-related quantity being increasing.

7. A vehicle control device comprising a controller to which at least a steering wheel angle, an accelerator position, a vehicle speed and a brake fluid pressure are input, and which is configured to control a driving force output from a driving force generator based on the steering wheel angle, the accelerator position, the vehicle speed and the brake fluid pressure, wherein the controller is configured to:
when the steering wheel angle is increasing and the steering speed is not decreasing,
acquire an additional deceleration to be added to the vehicle according to the steering speed with reference to a map defining the additional deceleration to be set according to the steering speed;
acquire a correction coefficient K1 set according to the vehicle speed, a correction coefficient K2 set according to the steering wheel angle, a correction coefficient K3 set according to the accelerator position and a correction coefficient K4 decided according to a deceleration to be generated in the vehicle calculated based on the brake fluid pressure;
correct the additional deceleration in such a manner that it is reduced by multiplying the additional deceleration by the correction coefficients K1, K2, K3 and K4 of 1 or less;
set the corrected additional deceleration to 0, when the corrected additional deceleration is less than a given determination threshold and a value derived by multiplying the additional deceleration by the correction coefficients K1 and K2 is less than the given determination threshold;
set the corrected additional deceleration to 0, when the corrected additional deceleration is less than the given determination threshold, the value derived by multiplying the additional deceleration by the correction coefficients K1 and K2 is equal to or greater than the given determination threshold and a value derived by multiplying the additional deceleration by the correction coefficients K3 and K4 is equal to or greater than the given determination threshold;
maintain the corrected additional deceleration, when the corrected additional deceleration is less than the given determination threshold, the value derived by multiplying the additional deceleration by the correction coefficients K1 and K2 is equal to or greater than the given determination threshold and the value derived by multiplying the additional deceleration by the correction coefficients K3 and K4 is less than the given determination threshold, or when the corrected additional deceleration is equal to or greater than the given determination threshold; and
reduce the driving force so as to generate the corrected additional deceleration;
reduce the driving force so as to generate the additional deceleration at the maximum steering speed when the steering wheel angle is increasing and the steering speed is decreasing; and
increase the driving force so as to reduce the additional deceleration when the steering wheel angle is not increasing.

* * * * *